United States Patent [19]

Tanaka

[11] Patent Number: 4,945,011
[45] Date of Patent: Jul. 31, 1990

[54] STORAGE BATTERY PROVIDED WITH ELECTROLYTIC SOLUTION STIRRING DEVICE

[75] Inventor: Masafumi Tanaka, Kyoto, Japan

[73] Assignee: Japan Storage Battery Company Limited, Kyoto, Japan

[21] Appl. No.: 379,769

[22] Filed: Jul. 14, 1989

[30] Foreign Application Priority Data

Jul. 20, 1988 [JP] Japan .................................. 63-180982

[51] Int. Cl.⁵ .............................................. H01M 2/38
[52] U.S. Cl. .......................................... 429/81; 429/51
[58] Field of Search ................................ 429/51, 67, 81

[56] References Cited

U.S. PATENT DOCUMENTS

| | | | |
|---|---|---|---|
| 3,083,253 | 3/1963 | Sundberg | 429/51 |
| 4,283,467 | 8/1981 | Gutlich et al. | 429/51 |
| 4,308,322 | 12/1981 | Hammar | 429/53 |
| 4,507,367 | 3/1985 | Ruch et al. | 429/27 |
| 4,565,748 | 1/1986 | Dahl | 429/81 |

FOREIGN PATENT DOCUMENTS

| | | | |
|---|---|---|---|
| 1267735 | 12/1964 | Fed. Rep. of Germany | 429/67 |
| 60-37651 | 2/1985 | Japan | 429/67 |
| 2004409 | 3/1979 | United Kingdom . | |

Primary Examiner—Stephen J. Kalafut
Attorney, Agent, or Firm—Sughrue, Mion, Zinn, Macpeak & Seas

[57] ABSTRACT

A stirring device for the electrolytic solution in a storage battery. A solution circulating tube having open opposite ends is disposed in the electrolytic solution. The open top opens to a gas reservoir having an inverted J shape and opening downward in the upper part of the solution. A gas collecting chamber collects gas bubbles generated by the electrode plates and this gas enters an inverted U-shaped siphon strap which opens at one end to the chamber and at the other end to the tube via a small hole in the tube at a middle portion thereof. The gas in the siphon strap forces solution and gas from the upper part of the tube and gas reservoir into the upper part of the electrolytic solution via the gas reservoir opening.

4 Claims, 2 Drawing Sheets

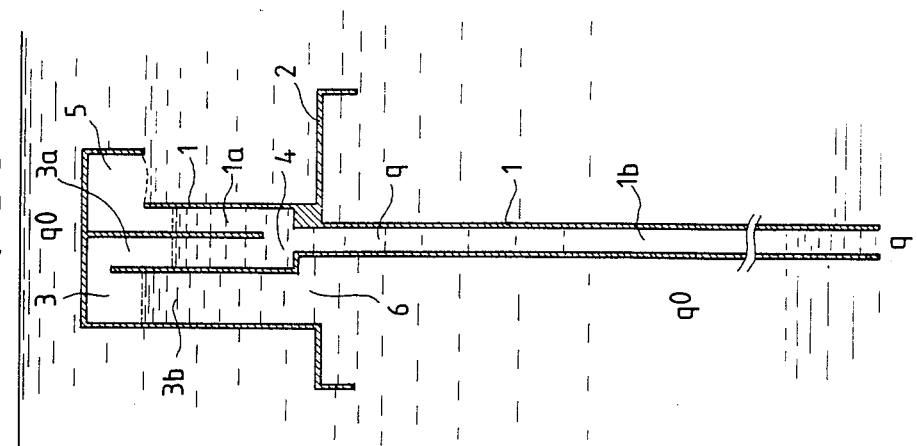
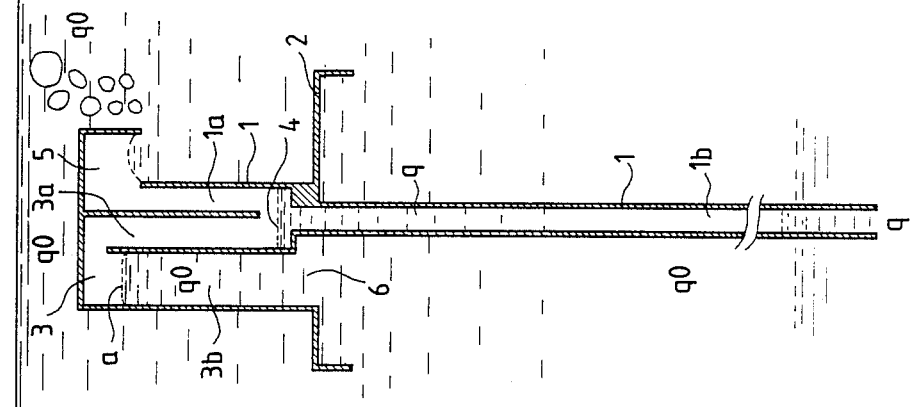
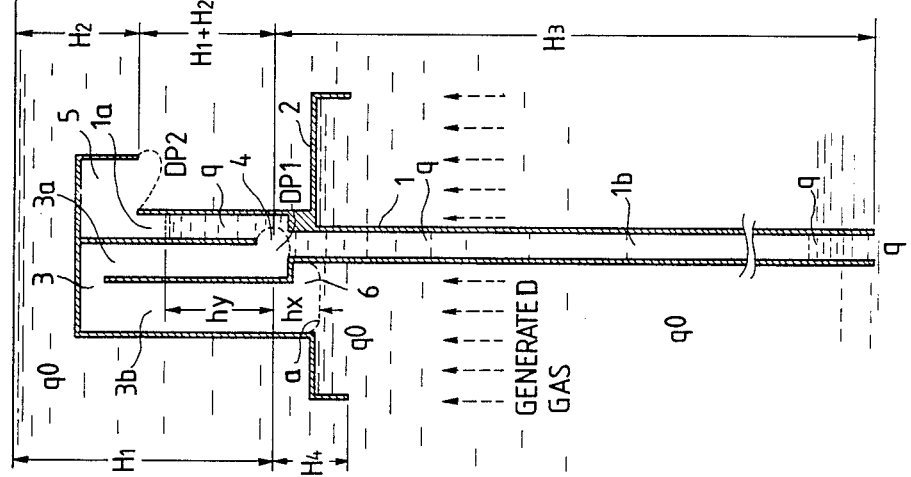

STORAGE BATTERY PROVIDED WITH ELECTROLYTIC SOLUTION STIRRING DEVICE

BACKGROUND OF THE INVENTION

The present invention relates to a storage battery provided with an electrolytic solution stirring device.

In storage batteries, an electrolytic solution is directly involved in a reaction resulting in the generation of electric power. Accordingly, it is well known that the capacity of a storage battery is greatly affected by the efficiency in utilization of the electrolytic solution in the storage battery as well as the efficiency in utilization of active matters of the electrode plates thereof.

In the case of a lead storage battery, the specific gravity of the electrolytic solution at the upper portion of the storage battery is lowered during the charge and discharge periods so that electrolytic solution which is high in specific gravity always remains at the lower portion of the storage battery.

To eliminate this disparity in density between portions of the solution, a gas is generated by overcharging so that the specific gravity of upper and lower portions of the electrolytic solution can be made uniform by the stirring action of the gas. In general, in the case where the storage battery is small in height, the specific gravity of the electrolytic solution can be made uniform relatively easily by overcharging. However, in the case where the storage battery used is large in height, like an electric car storage battery, generally, the specific gravity cannot be made uniform by some degree of overcharging. As a result, the electrolytic solution at the upper portions of the electrode plates always has a low specific gravity, so that the capacity of the battery is lowered. On the other hand, electrolytic solution having a high specific gravity and a strong oxidizing property always remains at the lower portions of the electrode plates, so that the lower end portions of the electrode plates are corroded to shorten their lifetime. For this reason, in general, overcharging is carried out whenever the storage battery is charged. As a result, not only is electric power wasted but the lifetime of the storage battery is shortened.

On the other hand, in the case of floor type storage batteries, various loads are connected to the storage batteries. Because some of those loads are not suited to a large voltage change due to charging, a constant-voltage charging system, in which the charging voltage is limited to a predetermined value, is often used. To solve those problems, uniform charging for a long time of 12 to 24 hours has been carried out. In the existing circumstances, however, the aforementioned problems cannot be solved because the uniform charging voltage is low.

In the case of a load-leveling large-capacity stationary battery, stirring is carried out periodically by forcing air into the battery from the outside. As a result, it has been confirmed that the battery lifetime may double depending on the existence of a stirring device. Further, the charge quantity during each charging generation can be reduced by 10%. As a result, consumption of water in the electrolytic solution due to overcharging can be reduced remarkably so that the water supply cycle is prolonged by five times, resulting in a remarkable reduction in maintenance cost.

However, the stirring device currently used requires compressor piping and the like, so that the overall cost increases and the use of such a stirring device is limited to batteries used for specific purposes.

SUMMARY OF THE INVENTION

The present invention provides an electrolytic solution stirring device which is not an external forced stirring device as used currently, but which uses the energy resulting from generation of a gas in the battery and which eliminates the aforementioned defects. The electrolytic solution stirring device is characterized in that the device comprises: a solution-circulating tube having a small hole at a middle portion thereof and disposed vertically in an electrolytic solution; a gas-collecting chamber having a lower-end opening below the position of the small hole of the solution-circulating tube and disposed above the electrode plates; an inverted U-shaped siphon strap for communicating the small hole and the gas-collecting chamber with each other; and a gas reservoir provided at an upper end opening of the solution-circulating tube.

DETAILED DESCRIPTION OF A PREFERRED EMBODIMENT

An embodiment of the present invention will be described in detail with reference to the drawings.

Figure 2:
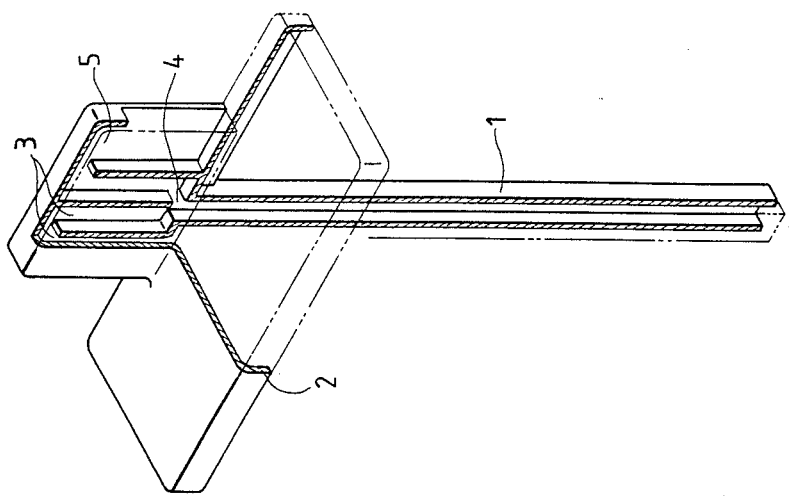
FIG. 2 is a partly cutaway perspective view of the electrolytic solution stirring device; and, FIGS. 3A to 3C are views for explaining the operation of the storage battery having the electrolytic solution stirring device according to the present invention.
Figure 1:
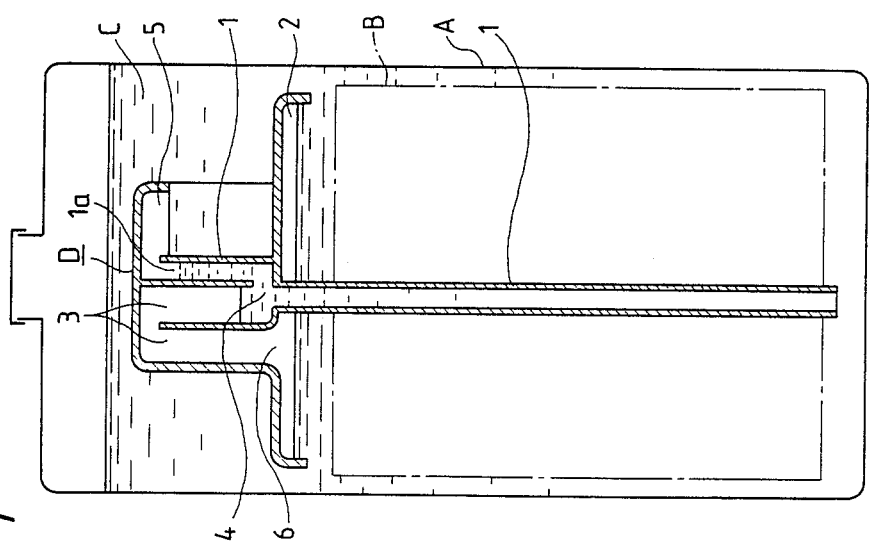
FIG. 1 is a sectional view showing an embodiment of the storage battery having the electrolytic solution stirring device according to the present invention.

FIG. 1 is a sectional view showing an embodiment of a storage battery having the electrolytic solution stirring device according to the present invention, and FIG. 2 is a partly cutaway perspective view of electrolytic solution stirring device.

In the drawing, A is a cell having electrode plates received therein; B is the electrode plates; C is an electrolytic solution; and D is the electrolytic solution stirring device.

The electrolytic solution stirring device D is provided with: a solution-circulating tube 1 having a lower end opened to the bottom of the cell, an upper end opened in the vicinity of the surface of the electrolytic solution, and a small hole 4 at its middle portion; a gas-collecting chamber 2 having a lower-end opening located below the small hole 4 for collecting a gas generated from the electrode plates B; an inverted U-shaped siphon strap 3 for communicating the small hole and the gas-collecting chamber with each other. Further, a gas reservoir 5 is formed at the upper-end opening of the solution-circulating tube 1 by covering the upper end portion of the solution-circulating tube with a cap opened at its lower surface or by turning down the upper end portion of the solution-circulating tube in the form of an inverted J-shape.

In the embodiment illustrated in the drawings, the solution-circulating tube 1 is bent or curved at the position of the small hole 4. The shape of the solution-circulating tube 1 is for the purpose of facilitating removal of the stirring device from a mold when the device is integrally molded with synthetic resin. The curved solution-circulating tube 1 is not different in operation from a linear one.

In a stirring device having a structure as described above, a gas generated from the electrode plates B during the charging operation or the like is collected and accumulated in the gas-collecting chamber 2. The electrolytic solution entering into the inverted U-shaped siphon strap 3 is pressed back through the small hole 4 into the solution-circulating tube 1 corresponding to the accumulation of the gas. When the quantity of gas accumulated in the gas-collecting chamber 2 increases so that the gas reaches the small hole 4, the gas is pressed out through the small hole 4 into the solution-circulating tube 1 in the form of bubbles. When the pressure of the gas bubbles and the gas in the gas-collecting chamber increases to overcome the pressure of the electrolytic solution existing in a portion (1a) above the small hole 4, the gas bubbles move up while pressing the electrolytic solution existing in the portion 1a above the small hole, that is, the electrolytic solution existing in the portion 1a of the solution-circulating tube 1, so that the gas bubbles are released together with electrolytic solution from the upper-end opening of the solution-circulating tube 1. At the same time, the pressure of the solution in the solution-circulating tube 1 decreases, so that the electrolytic solution at the bottom of the battery enters and ascends from the lower-end opening of the solution-circulating tube. Accordingly, the electrolytic solution of high specific gravity in the solution-circulating tube 1 is pressed up to a position above the small hole 4 where the pressure thereof is balanced with the pressure of electrolytic solution existing around the solution-circulating tube and the electrolytic solution becomes stable. In this state, the gas generated from the electrode plates is accumulated again in the gas-collecting chamber 2, and the aforementioned operation is repeated.

In the device according to the invention, the gas reservoir 5 is provided at the upper-end opening of the solution-circulating tube 1 so that the electrolytic solution inside the solution-circulating tube 1 and the electrolytic solution outside the upper-end opening are isolated from each other through a gas phase. Accordingly, even though the upper-end opening of the solution-circulating tube 1 is located below the surface of the electrolytic solution, the electrolytic solution outside the upper-end opening never flows backward into the solution-circulating tube 1, that is to say, the electrolytic solution always moves from the lower end to the upper end of the solution-circulating tube.

The operation of the device according to the invention will be described in more detail with reference to FIG. 3. FIG. 3 is a series of views for explaining the operation of the device according to the invention. Reference symbols used in the drawings are as follows.

q0 . . . Specific gravity of electrolytic solution at the upper portion.
q . . . Specific gravity of electrolytic solution at the bottom of the battery.
H1 . . . Liquid height between a liquid surface and the small hole 4.
H2 . . . Liquid height between the liquid surface and the lower end of the gas reservoir.
H3 . . . Liquid height between the small hole 4 and the lower end of the solution-circulating tube 1.
H4 . . . Liquid height between the small hole 4 and the lower end of the gas-collecting chamber 2.
hx . . . Liquid height between the small hole 4 and a gas-phase surface in the gas-collecting chamber side of the inverted U-shaped siphon strap 3.
hy . . . Liquid height between the upper-end liquid surface in the solution-circulating tube 1 and the small hole 4.
DP1 . . . Surface tension produced at the small hole 4 portion.
DP2 . . . Surface tension produced at the lower end portion of the gas reservoir 5.

FIG. 3A shows the condition in which a generated gas is accumulated little by little in the inverted U-shaped siphon strap 3 in charging the battery or the like, so that the electrolytic solution of high specific gravity q at the bottom of the cell enters the solution-circulating tube 1. In other words, FIG. 3A shows the condition in which the solution near the small hole is picked out into the solution-circulating tube through the small hole 4 by the increased pressure inside the siphon strap, and the gas in the tube enters the solution-circulating tube through the small hole 4. In this condition, the pressure balance becomes as follows:

$$(H1+hx)q0=H2\ q0+hy\ q+Dp1+Dp2 \tag{1}$$

When hx increases even slightly, the above relationship is broken so that the electrolytic solution in the portion 1a of the solution-circulating tube 1 is ejected from the upper end thereof as shown in FIG. 3B. At the same time, the pressure in the solution-circulating tube decreases correspondingly to the quantity of the ejected electrolytic solution, so that the pressure in the gas-collecting chamber side tube of the siphon strap decreases. Accordingly, the electrolytic solution ascends within the inverted U-shaped siphon strap. According to the pressure balance expression in a stationary state, the position to which the liquid surface ascends at this time is the upper end of the solution-circulating tube. In practice, however, the ascension of the liquid surface is so powerful that the liquid surface ascends over the upper end of the solution-circulating tube by the force of inertia, and it is therefore preferable to arrange the upper end of the inverted U-shaped siphon strap above the upper end of the solution-circulating tube.

When this excessive condition is finished, the condition is stabilized as shown in FIG. 3C, and thereafter the accumulation of gas is started again.

Because the specific gravity q0 of the electrolytic solution at the upper portion outside the solution-circulating tube 1 is lower than the specific gravity of the electrolytic solution inside thereof, the surface of the electrolytic solution entering the gas-collecting chamber side 3b of the siphon strap 3 becomes stationary at a position higher than the liquid surface in the solution-circulating tube 1. If the upper end portion of the solution-circulating tube 1 is not covered with the gas reservoir 5, the low specific gravity upper electrolytic solution would enter into the solution-circulating tube from the upper end thereof. If the upper electrolytic solution is mixed in the solution-circulating tube, the stirring efficiency by the device according to the invention would deteriorate remarkably, as will be described later.

The larger the volume of the gas reservoir 5, the larger the isolating effect. When this volume is small, the gas remaining in the gas reservoir 5 is exhausted together with the electrolytic solution when the electrolytic solution is ejected from the solution-circulating tube, so that the upper electrolytic solution may enter into the solution-circulating tube at this moment. If the internal dimension of this portion is small, the surface tension at a gap in the portion becomes large, so that the liquid height (pressure) equivalent to the surface tension is required when the generated gas enters into the solution-circulating tube 1 from the small hole 4 through the siphon strap 3, that is to say, it is necessary that the distance between the lower end of the gas-collecting chamber and the small hole is established to be large. If the distance is improperly established, the generated gas will escape from the lower end of the gas-collecting chamber. For this reason, it is preferable that the inner cross-sectional areas of the gas reservoir 5 is established to be sufficiently larger than the inner cross-sectional area S of the solution-circulating tube. By providing the gas reservoir 5, a stable stirring effect can be obtained regardless of the position of the surface of the electrolytic solution.

The pressure balance in the gas reservoir shown in FIG. 3A is expressed as follows.

$$(h_y + H_3)q = (H_1 - H_2 + H_3)q_0 + D_{p2} \quad (2)$$

From the expressions (1) and (2), hx is calculated as follows.

$$h_x = [qp_1 + 2D_{p2} - (q - q_0)H_3]/q_0 \quad (3)$$

As will be understood from the expression (3), the value of hx becomes maximum when $q = q_0$. Since the surface tension Dp1 produced at the small hole 4 portion and the surface tension Dp2 produced at the lower end portion of the gas reservoir 5 ensure a sufficient gas passage, a gap is established so that the head of the surface tensions is not larger than 2 to 3 mm. Assuming now that $D_{p1} + D_{p2} = 5$ mm (value of head) and that the specific gravity $q_0 = 1.2$, the gas in the inverted U-shaped siphon strap enters into the upper portion 1a of the solution-circulating tube to thereby eject a sulfuric acid from the inside to the outside of the tube 1a when hx becomes 4 to 5 mm. This condition is shown in FIG. 3B.

When the specific gravity of the electrolytic solution inside the tube 1 is equal to the specific gravity of the electrolytic solution outside the tube 1 as described above, the gas-phase surface (a) descends to the lowermost position. When $q > q_0$, as will be understood from the expression (3), hx becomes negative and the gas-phase surface (a) becomes higher than the small hole 4. In this condition, the generated gas can enter the small hole 4 as follows. As is evident from the expression (2), the value of hy decreases as the value of q increases. In other words, the surface of the electrolytic solution in the upper solution-circulating tube 1a descends as the specific gravity q increases. When the difference in specific gravity between q and q0 exceeds a predetermined value, hy becomes negative, so that a condition in which no electrolytic solution exists in the upper solution-circulating tube 1a occurs. In this condition, the gas-phase surface (a) ascends near the uppermost portion of the inverted U-shaped siphon strap, so that the generated gas is freely passed through the small hole 4 and exhausted out of the tube through the upper solution-circulating tube 1a.

As described above, the pushing force of the electrolytic solution (stirring capacity of the stirring device is proportional to hx, and when the value of $(q - q_0)$ exceeds a predetermined value, hx becomes negative as described above, so that the stirring capacity is lost.

The stirring capacity and hx can be increased as follows. As will be understood from the expression (2), the larger the value of $(H_1 - H_2)$ is made, the larger the value hy becomes. However, the height of the stirring device becomes large as the value hy is made large.

On the other hand, the pushing force of the electrolytic solution increases if the inner cross-sectional area of the upper solution-circulating tube 1a is made large. If the inner cross-sectional area exceeds 60–80 mm², however, the phenomenon of substitution of gas for electrolytic solution occurs in the tube 1a so that the stirring capacity is lowered.

Further, the pushing force of the electrolytic solution increases relative to the quantity of generated gas as the inner volume of the inverted U-shaped siphon strap 3 is made smaller. If the gas passage 3a, 3b is so narrow that liquid film can be formed in the siphon strap 3, however, surface tension Dp3 other than Dp1+Dp2 in the expression (3) is produced to thereby increase hx rapidly. As a result, when hx becomes larger than H4, the generated gas escapes from the lower end portion of the gas-collecting chamber 1 of the stirring device so that the stirring device becomes inoperative.

FIG. 3B is a view showing the excessive condition just after the electrolytic solution in the tube is exhausted out of the tube by the generated gas entering into the upper solution-circulating tube 1a from the small hole 4. The distribution of pressure in this excessive condition can be analyzed by mathematics as follows.

In the case where no electrolytic solution exists in the upper solution-circulating tube as shown in FIG. 3B, and in the case where the pressure in the siphon strap is reduced, Dp1 and Dp2 in the expression (1) can be ignored so that the expression $h_x = -(H_1 - H_2)$ can be obtained from the expression (1). In short, the siphon strap 3b side gas-phase surface (a) ascends to the top end of the tube 1a. If the upper opening 6 of the gas-collecting chamber and the small hole 4 are directly connected, not through the inverted U-shaped siphon strap 3, the electrolytic solution of low specific gravity q0 at the upper portion of the battery flows in the solution-circulating tube from the small hole 4 so that the electrolytic solution of high specific gravity at the lower end of the tube cannot be pressed up. As described above, the most important point in this invention is that the inverted U-shaped siphon strap is employed. The movement of electrolytic solution is perfectly cut off by the siphon strap though a gas can moves freely from the side 3b to the side 3a of the siphon strap. As described above, in the excessive condition, the gas-phase surface (a) in the side 3b of the inverted U-shaped siphon strap 3 ascends to the upper end of the solution-circulating tube. It is therefore preferable that the peak of the inverted U-shaped siphon strap 3 is higher than the upper end of the tube 1.

In the condition shown in FIG. 3B, both the pressure in the siphon strap 3 and the pressure in the upper solution-circulating tube 1a are slightly reduced momentarily. Accordingly, when the gas-phase surface (a) ascends, the electrolytic solution tries to enter into the upper solution-circulating tube from the lower end of the gas reservoir. However, the pressure of $-q_{p2}$ due to film produced by surface tension acts on the lower end of the gas reservoir to prevent the backward flow of the electrolytic solution into the tube 1a. Therefore, even though the stirring device sinks under the solution, the lower electrolytic solution can be pressed up without mixing the upper electrolytic solution of low specific gravity in the tube 1a.

FIG. 3C is a view showing the stable condition in which the electrolytic solution of high specific gravity q is pressed up from the bottom of the cell through the solution-circulating tube after the excessive condition shown in FIG. 3B. When the generated gas has accumulated in the inverted U-shaped siphon strap 3, the battery is returned to the condition of FIG. 3A.

In the following, the result of an experiment is shown for reference. When $H1-H2$, $H3$ and the inner cross-sectional area of the solution-circulating tube 1a were established to be 50 mm, 30 cm and 50 mm$^2$, respectively, the electrolytic solution stirring capacity was identified by the quantity of a gas generated during an overcharging of 20 A, the gas quantity being 800 cc/hour in the condition of $q-q0 = 0.10$ and being 2/hour in the condition of $q-q0=0.05$.

The device according to the present invention has the aforementioned structure. The electrolytic solution stirring device can be made compact. Any shape can be adopted to the gas-collecting chamber arranged above the electrode plates, as long as the chamber can collect a part of the gas generated in the electrode plates. Further, the gas reservoir is provided at the upper end of the solution-circulating tube, by which lowering of the stirring effect can be prevented regardless of the position of the upper end of the solution-circulating tube in the electrolytic solution. Further, the internal diameter of the solution-circulating tube for sucking up the electrolytic solution can be established to be about 2 mm to about 3 mm, so that the tube can be inserted in any space within the battery. Accordingly, the invention has high practicality in that it can be applied to all storage batteries and so on.

What is claimed is:

1. A storage battery of the type having electrode plates immersed in an electrolytic solution; said battery being provided with an electrolytic solution stirring device comprising:
    a vertically disposed solution-circulating tube positioned within said battery and being open at its upper and lower ends; said tube having a small hole therein at a middle portion thereof and a gas reservoir provided at said upper open end;
    a gas-collecting chamber disposed above said plates and having a lower end opening below the level of said small hole; and
    an inverted U-shaped siphon strap connected between said gas-collecting chamber and said small hole for communicating fluid between said gas chamber and said tube via said small hole.

2. A storage battery as claimed in claim 1, wherein said gas reservoir has an inverted J shape with the opening thereof to the battery electrolytic solution facing downward.

3. An electrolytic solution stirring device for use in a storage battery of the type having electrode plates immersed in an electrolytic solution, said stirring device comprising:
    a solution-circulating tube being open at its upper and lower ends; said tube having a small hole therein at a middle portion thereof and a gas reservoir provided at said upper open end;
    a gas-collecting chamber having a lower end opening below the level of said small hole; and
    an inverted U-shaped siphon strap connected between said gas-collecting chamber and said small hole for communicating fluid between said gas chamber and said tube via said small hole.

4. An electrolytic solution stirring device as claimed in claim 3, wherein said gas reservoir has an inverted J shape with the opening thereof facing toward the lower end of said solution circulating tube.

* * * * *